A. K. CROSS.
DRAWING TABLET.
APPLICATION FILED MAY 13, 1914.

1,282,382.  Patented Oct. 22, 1918.

WITNESSES:

INVENTOR.
Anson K. Cross
BY
ATTORNEY.

UNITED STATES PATENT OFFICE.

ANSON K. CROSS, OF BROOKLINE, MASSACHUSETTS.

DRAWING-TABLET.

1,282,382.  Specification of Letters Patent.  Patented Oct. 22, 1918.

Application filed May 13, 1914. Serial No. 838,392.

*To all whom it may concern:*

Be it known that I, ANSON K. CROSS, a citizen of the United States, and resident of Brookline, in the county of Suffolk and State of Massachusetts, have invented certain new and useful Improvements in Drawing-Tablets, of which the following is a specification.

My invention relates to improvements upon the Patent No. 1,041,435 on a drawing tablet issued to me October 15, 1912 which broadly covered the combination with a transparent drawing tablet of any means by which a horizonal position of the tablet may be indicated.

Practical use in the school room and the necessity for making the tablet in a cheap, durable and adjustable form have resulted in a very different construction from that shown in the patent of 1912, wherefore the present application for patent is made to secure protection for the practical details essential to the use and manufacture of the drawing tablet. My drawing tablet consists of a transparent tablet with an opaque tablet behind it and a spirit level to show when the tablet is in a horizontal position. My drawing tablet is intended to be used instead of paper. It is held in the hand, and the student draws upon it with a special crayon adapted to mark on glass. When the student has made the drawing as correctly as possible by eye alone and without measuring or testing appearances in any way, he draws out the opaque tablet from behind the glass, and holds the glass between his eye and the object in such a position that if correct it appears to cover the object. If it does not do this perfectly, when one line or part of the drawing does appear to cover the object, the errors are at once evident, and the student thus instructs himself and gains faster than when drawing on paper and depending upon a teacher for corrections, or upon the usual inaccurate ways of testing free-hand sketches.

Of the accompanying drawings, forming a part of this specification,

Figure 6:

Fig. 6 a side view, both enlarged, of the metal plate which protects the spirit level.

The same reference characters indicate the same parts in all the figures.

The transparent tablet $a$ may be of glass, celluloid, or any other substance that may be marked upon, and through which the object to be drawn may be seen. A fine wire gauze may be used, but I prefer to use window glass which I protect by a frame $b$. This may be of metal or papier mâché, wood pulp, or other suitable material. I prefer to use wood, and to mortise and tenon and glue the four sides together.

The sheet pane or tablet of glass, being subject to breakage, must be readily replaceable, as well as being firmly held. This prevents the use of putty, and as glass varies in thickness it is necessary to provide means for clamping it to the frame which will hold panes varying in thickness from one-sixteenth of an inch to about one-eighth of an inch, for the single thick glass panes which I prefer to use vary as much as this. I accomplish this result by making the rabbet in the short sides of the frame as deep as the thickest glass that is to be used, and making the rabbet in the long sides of the frame as deep as the thinnest glass that is to be used and providing two binding strips $b'$ adapted to fit in the rear sides of the strips $b$ and to hold the glass firmly in place within $b$ by means of screws $c$. When a thin sheet of glass is used the strips $b'$ bend and thus bear firmly upon the glass whatever its thickness.

The spirit level $d$ is inserted in a recess cut in the edge of the frame. I prefer to place one spirit level in one long edge and another in one short edge, though I have shown but one and use but one in the lower priced forms of my invention.

A metal plate $e$ is placed above the spirit level to protect it, and also to furnish the sights for reading the level. The central part of this plate has a hole cut in it to permit the light to shine upon the level, and the metal cut out is turned down in the form of two ears $e'$, which serve to prevent the thin sides of the piece $b$ from being crushed in upon the level. The central part of each ear is cut away in a circular outline so that it may complete the circular form of the air bubble and thus serve as a better means of locating the bubble than the usual lines or marks cut on the glass or on the metal plate about it.

Figure 1:
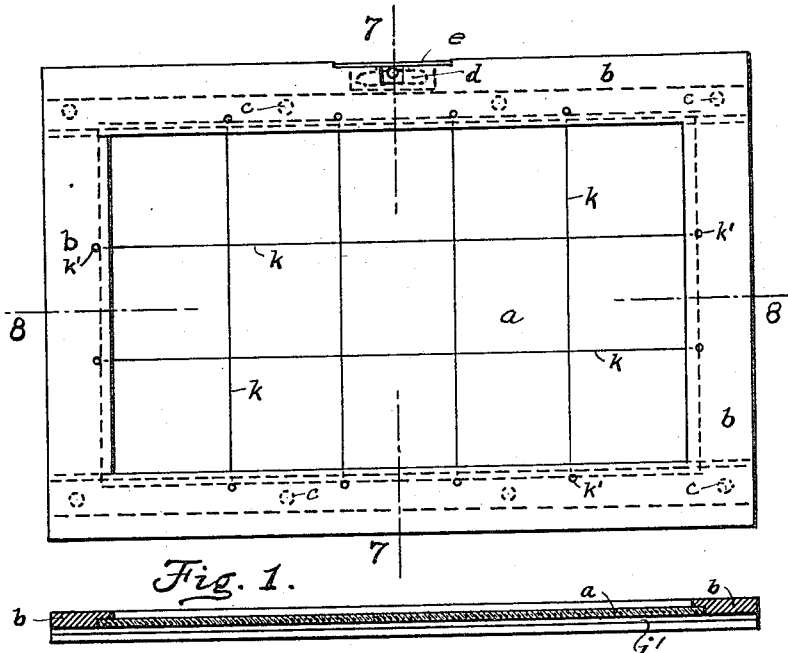
Figure 1 represents a side elevation of a drawing tablet embodying my invention.
Figure 3:
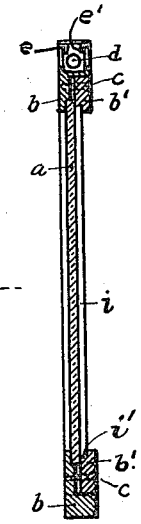
Fig. 3 represents a section on line 7—7 of Fig. 1.
Figure 4:
Fig. 4 represents a section on line 8—8 of Fig. 1, the opaque tablet not being represented.
Figure 2:
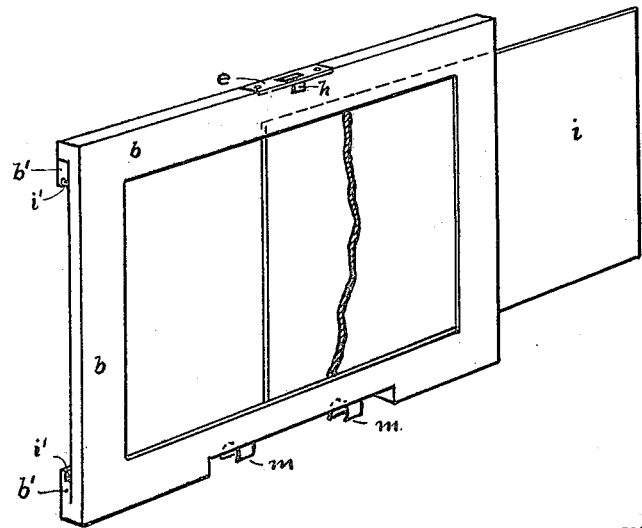
Fig. 2 represents a perspective view showing part of the transparent tablet broken away and the opaque tablet partly withdrawn from behind the transparent tablet.
Figure 5:
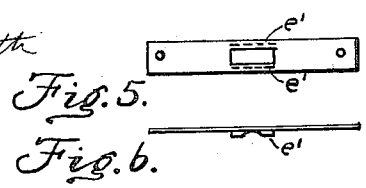
Fig. 5 represents a top view.

To enable the level to be read when the tablet is seen as in Fig. 1, the central part of each wall about the level is cut away over a distance equal to about twice the diameter of the bubble. This allows the light to pass through the spirit level and make the bubble visible when the glass is seen from in front under a good light.

To make the bubble visible when the light is dim and uncertain I have found it necessary to use a colored liquid which by contrast with the colorless air bubble within it enables the student to readily use the level in any light.

The opaque tablet $i$ may be of cardboard or celluloid. It is fitted to slide in grooves $i'$ cut in the inner edges of the binding strips $b'$, and may be wholly or partially withdrawn either way as desired.

The directions for using the drawing tablet may be printed on one of its surfaces but the white side should always be against the glass when the drawing is being made.

The lines $k$ of Fig. 1 represent threads or fine wires which may be passed through small holes $k'$ drilled in the edges of the pieces $b$. Or they may represent lines drawn or engraved on the back of the transparent tablet $a$, or lines drawn or printed on the front of the opaque tablet $i$.

The special crayon which marks on glass being soft it is advisable to provide means for carrying it and for protecting it. I do this by cutting away the central part of the lower edge $b$ for a space sufficient to hold the crayon, and by means of metal clips $m$ secured to the frame $b$ the crayon may be retained within the edge of the frame.

This simple and inexpensive construction enables the art student who uses it artistically to gain as much visual power in a few months as is attained under usual methods in years of study.

It must be understood that this tablet is not intended for tracing appearances, or for enabling the student to measure one by one apparent angles, and lengths, in order that these mechanical measures may enable him to produce an exhibition drawing. No measurements or tests will enable any student to produce a work of art, or even a truthful representation of the apparent forms of objects. This can only be done by an eye trained to see correctly.

Most instruction in drawing either allows the student to make a free-hand sketch without measuring or testing its truth in any way, or else permits the student to measure and test as much as he pleases by use of his pencil or ruler or other equally inaccurate device.

The improvement in my method consists in requiring the student to make many rapid sketches by eye alone, without applying any tests until the sketches have been carried as far as possible by eye alone, and then applying the perfect test of withdrawing the opaque card and holding the drawing before the object to see if its lines will cover those of the object when the tablet has been leveled by use of the spirit level. Thus while making the drawing free-hand in the most artistic way, the drawing has been possible after it is completed, for the student himself to test it instantly and perfectly, so that he understands his failures and quickly gains such truth of sight that he can draw artistically and correctly at first touch.

When this happens he may want to use the drawing tablet as a finder in order to study the composition of his subject in its relation to the size and proportions of the drawing to be made, and with the exclusion of extraneous objects. The sliding card enables him to do this readily, for by sliding it an opening of any desired proportion may be obtained through which to study the subject.

The artist often wishes to enlarge small sketches. He does this by drawing small squares upon the sketches and larger ones upon the surface where the enlargement is desired.

I have constructed the frame of the tablet with reference to this use. In Fig. 1 fifteen equal squares are shown but any other number may be employed. These squares may be on the glass and thus used when the opaque tablet is withdrawn, for measuring the proportions of anything the artist may wish to draw on paper or canvas.

The squares may be made by threads $k$ secured in the holes $k'$ in which case the transparent tablet may be taken out of the frame to lighten it when the frame is large.

The squares may be drawn upon the opaque tablet so that they may be placed in any desired relation to a sketch drawn upon the transparent tablet.

It is thus evident that my invention is equally to be desired by both student and professional artist.

It is plain that my ideas may be embodied in many different ways and materials without departing from the scope of my invention.

What I claim and desire to secure by Letters Patent is:

1. An article for use in the study of freehand drawing comprising a frame, a transparent plate or tablet mounted in said frame, and a spirit level fixed upon said frame in a position wherein light may pass through it to the eye of the user at the same time with the viewing of the tablet.

2. An article for use in the study of free-hand drawing comprising a frame, a transparent plate or tablet mounted in said frame, and a spirit level secured to one of the members of said frame, the said frame member having an aperture from front to rear beside the central part of the level.

3. An article for use in the study of free-hand drawing comprising a frame, a transparent plate or tablet mounted in said frame, and a spirit level set into a recess in the edge of one of the members of said frame, the said member having apertures opening into the middle part of said recess from the front and rear of the frame for giving illumination to the spirit level.

4. An article for use in the study of free-hand drawing comprising a frame, a transparent plate or tablet mounted in said frame, a spirit level tube set into a recess in the edge of said frame, and a plate covering said recess and overlying said tube, the plate having an ear struck out midway between its ends and bent down beside the tube and the frame being cut away beside said ear.

5. An article for use in the study of free-hand drawing comprising a frame, a transparent plate or tablet mounted in said frame, a spirit level tube set into a recess in the edge of said frame, and a plate covering said recess and overlying said tube, said plate having a light-admitting opening in its central part, and the frame having an opening from its front side into the mid portion of the recess exposing the side of the tube.

6. An article for use in the study of free-hand drawing comprising a frame, a transparent plate or tablet mounted in said frame, a spirit level set into a recess in the edge of said frame, the frame having a front opening in its face extending into the mid portion of the recess, and a plate mounted on the frame to overlie said recess and having sighting projections extending beside the tube and exposed to view in said front opening.

7. A transparent tablet for use in the study of free-hand drawing, a frame having means for holding said tablet, and an opaque tablet mounted on the frame behind the transparent tablet, said frame having guideways containing the opposite edges of said opaque tablet and being open at both ends, whereby said opaque tablet may be shifted in opposite directions.

8. A frame for use as a finder in the study of free-hand drawing, a spirit level mounted on the frame to show when the frame is level, and an opaque card mounted across the opening of the frame, said frame having holding means for said card with which the card is slidingly engaged, whereby the card may be moved so as to vary the proportions of the opening through which the student studies the appearance of the subject to be drawn.

9. A frame for use as a finder in the study of free-hand drawing, means for mounting an opaque element upon said frame in an adjustable manner such that it may be placed to cover any desired part of the space included between the sides of the frame, a spirit level adapted to indicate when the frame is in horizontal position, and means for dividing the space between the sides of the frame into a plurality of equal squares.

10. The combination with a transparent tablet adapted to receive markings on its surface and a frame bounding said tablet, of means adapted to cover the area within said frame and adjustably mounted for withdrawal to a greater or less extent whereby to make a sight opening in the frame similar to the proportions of the drawing to be made.

11. The combination with a transparent tablet adapted to receive markings on its surface and a frame bounding said tablet, of means adapted to cover the area within said frame and adjustably mounted for withdrawal to a greater or less extent whereby to make a sight opening in the frame similar to the proportions of the drawing to be made, and a means arranged to divide the area inclosed by said frame into equi-areal subdivisions.

12. A transparent tablet for use in the study of free-hand drawing having its area divided into equal equi-areal subdivisions and a spirit level connected with said tablet and adapted to indicate when the tablet is in a horizontal position.

13. A transparent tablet for use in the study of free-hand drawing and an opaque tablet adapted to be held behind the transparent tablet and to be withdrawn from this position and threads placed behind the transparent tablet and disposed so as to divide the area of the tablet into squares that may be used to determine the apparent proportions of what is seen behind the squares.

14. A transparent tablet for use in the study of free-hand drawing, a frame recessed to receive this tablet having the opposite sides recessed unequally, one pair to serve as a gage for the thinnest tablet that may be used, the other pair to serve as a gage for the thickest tablet that may be used and means for firmly binding to the frame tablets of any thickness between the two extremes as shown by the opposite edges of the frame.

15. A drawing tablet comprising a frame having longitudinal recesses in its members adapted and arranged to receive the edges of a plate, a transparent plate or tablet mounted on said frame with its edges in such recesses, and adjustable binding members secured to members of the frame so as to overlap opposite edges of the tablet.

16. A device for use in the study of free hand drawing comprising essentially a transparent tablet adapted to hold by adhesion upon its surface particles of material removed by attrition from a marking element traversing such surface, and a tube containing liquid and a bubble connected with said tablet in a manner such that the bubble in the tube may be viewed by transmitted light simultaneously with the viewing of the tablet, and the said liquid being of such color as to produce a color contrast between the liquid and bubble when thus viewed, whereby the device may be used and leveled in localities where the illumination is poor.

17. A device for use in the study of freehand drawing comprising a transparent tablet adapted to have lines drawn upon its surface, and a tanslucent spirit level mounted in a definite association with said tablet in position to be seen at the same time that a drawing on the tablet is viewed for the purpose of leveling such drawing.

18. A device for use in the study of freehand drawing comprising a frame, a transparent plate or tablet mounted in said frame adapted to have lines drawn upon its surface, and a spirit level mounted on said frame in a position enabling it to be seen at the same time that a drawing on the tablet is viewed, and in which also the level is enabled to show when a certain part of the device is horizontal.

19. A device for the use in the study of freehand drawing comprising a transparent tablet on which marks may be drawn, a frame carrying said tablet, and a translucent spirit level mounted on said frame in a position to show when a certain part of the device is horizontal, the frame being so formed and the level positioned also as to permit passage of transmitted light through the level to the eye of the user when the tablet is so held that the drawing thereon may be viewed.

In testimony whereof I have affixed my signature, in presence of two witnesses.

ANSON K. CROSS.

Witnesses:
P. W. PEZZETTI,
ARTHUR H. BROWN.

Copies of this patent may be obtained for five cents each, by addressing the "Commissioner of Patents, Washington, D. C."